Figure 1:
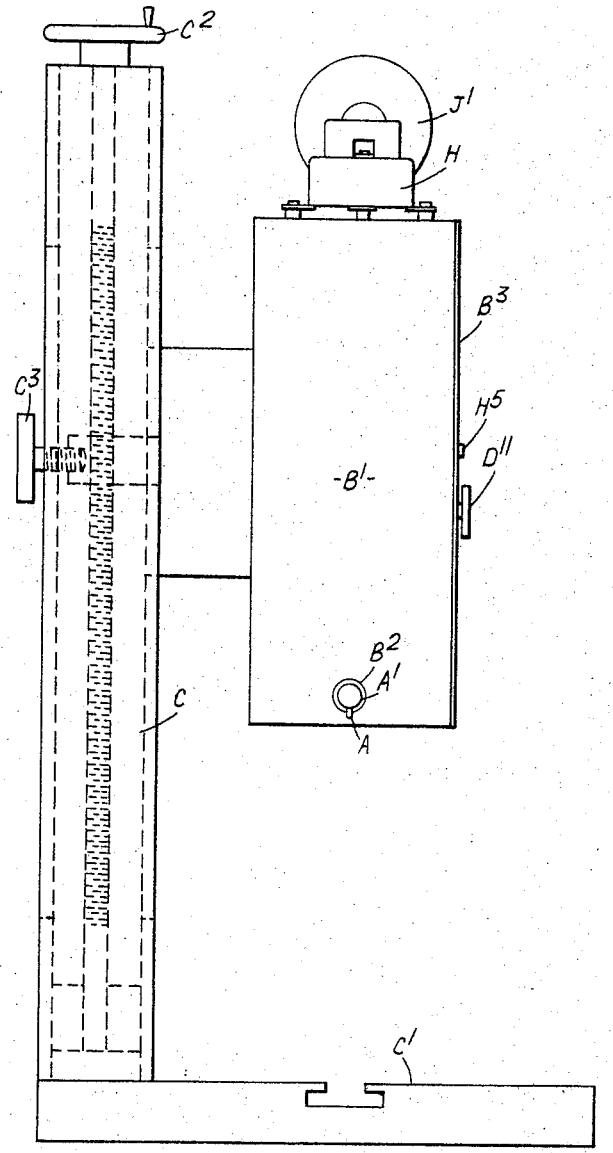

Inventor
RICHARD E. REASON
By
Attorneys

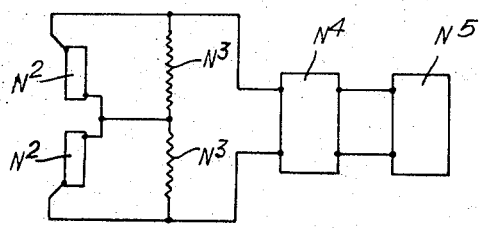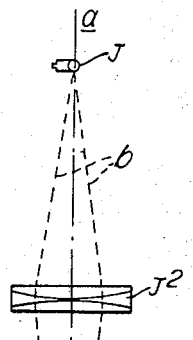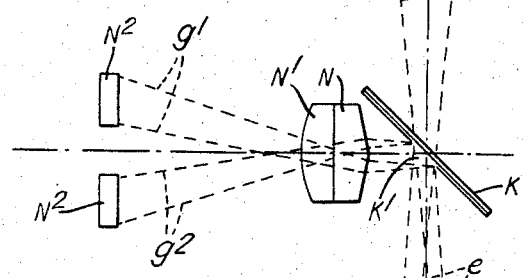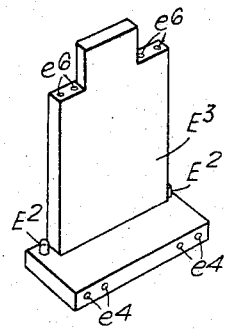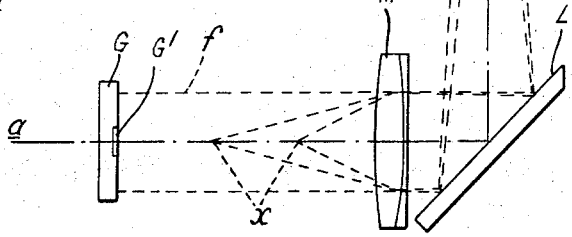

Inventor
RICHARD E. REASON

May 17, 1966 R. E. REASON 3,251,135
APPARATUS FOR MEASURING OR INDICATING LACK OF STRAIGHTNESS
OF A SURFACE
Filed July 8, 1963

Inventor
RICHARD E. REASON
By
Holcombe, Wetherill Brick
Attorneys

United States Patent Office 3,251,135
Patented May 17, 1966

3,251,135
APPARATUS FOR MEASURING OR INDICATING LACK OF STRAIGHTNESS OF A SURFACE
Richard E. Reason, Market Harborough, England, assignor to Rank Precision Industries Limited, trading as The Rank Organisation, Rank Taylor Hobson Division, Leicester, England, a British company
Filed July 8, 1963, Ser. No. 293,524
Claims priority, application Great Britain, July 9, 1962, 26,182/62; July 19, 1962, 27,800/62
16 Claims. (Cl. 33—172)

This invention relates to apparatus for measuring or indicating lack of straightness of a surface and of the kind having a feeler for traversing the test surface, such feeler being mounted to undergo working movement during traversing in a direction approximately normal to the test surface, and means for detecting the working movement of the feeler relative to an accurately straight reference datum.

Surface testing apparatus for indicating lack of straightness is known wherein a reference surface is mounted over the test surface, and the variations in the separation of such two surfaces are determined by an electrical transducer unit having a stylus engaging the test surface and a skid directly above such stylus and engaging the reference surface, the transducer unit being moved along between the two surfaces. This known arrangement is disadvantageous in that the necessary positional relationship between the stylus and the skid limits the versatility of the apparatus considerably, and in that it is difficult to maintain sensitivity and accuracy due to dirt or dust on the reference surface, since the arrangement does not readily permit protection of such reference surface for avoidance thereof.

An object of the present invention is to provide straightness testing apparatus of high sensitivity and accuracy which enables the disadvantages of the known arrangement to be substantially avoided.

The measuring or indicating apparatus according to the present invention comprises a reference element having an accurately straight reference surface lying substantially parallel to the surface under test, a feeler for engagement with the test surface, means for traversing the feeler along the test surface, a member movable along the reference surface in synchronism with the traversing of the feeler, means permitting the feeler to undergo a working movement during traversing in a direction approximately normal to the test surface, a reflector device carried by the movable member and capable of tilting relatively to the reference surface in accordance with the working movement of the feeler, optical means for projecting a collimated beam of light substantially parallel to the reference surface so as to be incident on the reflector device throughout traversing, detecting means responsive to the deflection of the reflected beam of light for providing the desired measurement or indication, and means for accurately locating such optical projection means and detecting means in predetermined relationship to the reference element at least during traversing.

The arrangement according to the invention is in no way limited as regards positioning of the feeler, so that the apparatus may readily be applied or adapted to the testing of a wide range of parts and particularly to the testing of long bores of relatively small diameter. In addition, the arrangement readily lends itself to the provision of means for shielding the reference surface against dirt and dust.

Conveniently, the feeler may be mounted on a feeler supporting arm pivotally mounted, about an axis substantially parallel to the reference surface transverse to the direction of traversing, on a carriage guided to move relative to the reference surface for traversing purposes. In this instance the pivotal mounting for the feeler supporting arm constitutes the means permitting the feeler to undergo its working movement during traversing. In one arrangement, the carriage has feet for riding on the reference surface. In another arrangement, the feeler supporting arm, at a point thereof adjacent to the pivotal connection to the carriage, has a skid for riding on the reference surface. Both of these arrangements constitute examples in which the movable member carries the feeler, such movable member being constituted by the carriage in the first arrangement and the feeler supporting arm in the second arrangement.

In the arrangements utilizing a pivotally mounted feeler supporting arm, the reflector device may conveniently be fixedly mounted on such arm. The pivotal mounting for the feeler supporting arm in these arrangements thus not only constitutes the means permitting the feeler to undergo its working movement, but also enables the reflector device to tilt in accordance with such working movement.

In a preferred arrangement, in order to provide for fine adjustment of the zero position of the detecting means in accordance with the initial position of the feeler when first engaged with the test surface before traversing, the locating means for the optical projection means and detecting means is adjustable to permit limited movement of such optical projection means and detecting means as a unit relative to the reference element.

Means are also preferably provided for correcting any slight error arising due to lack of straightness of the reference surface, such correcting means including an operable cam shaped to suit the errors of the reference surface and driven in synchronism with the movement of the movable member along the reference surface. In the preferred arrangement, such correcting means may conveniently act to effect adjustment of the locating means for the unit comprising the optical projection means and the detecting means. Alternatively however, the correcting means may comprise an optical deviator, such as a tiltable parallel-sided optical glass plate, provided in the path of the beam of light.

The apparatus may conveniently be housed within a casing which is movable on a support towards and away from the test surface. In this instance, adjusting means may be provided for effecting limited movement of the reference element relative to the casing to bring the reference surface into parallel relationship with the test surface.

The deflection responsive means may conveniently comprise a beam-splitting device for dividing the reflected beam of light into two portions, and two photocells on which the two portions of beam are respectively incident.

The tiltable reflector device preferably has a zero position in which it acts to reflect the collimated beam back along its axis to the deflection responsive means, whereby the optical projecting means constitutes an autocollimator.

For example, an especially stable autocollimating system of particular use in the present apparatus is that described and claimed in the present applicant's copending United States patent application Serial No. 292,920, filed July 5, 1963. In this instance, the reflector device comprises a plane mirror mounted to tilt in accordance with the working movement of the feeler about an axis generally perpendicular to the optical axis from a zero position in which the plane of such mirror lies at right angles to the optical axis, and the optical projection means comprises reflecting means lying in a plane which is inclined to the optical axis and intersects a plane at right angles to the optical axis in a line parallel to the axis of tilt of the tiltable mirror, such reflecting means extending over a part only of the useful area in such inclined plane to define two edges between light-transmitting and light-reflecting areas which extend at least approximately parallel to the axis of tilt of the tiltable mirror, a source from which light passes to the reflecting means and thence to the tiltable mirror, and a collimating lens between the reflecting means and the tiltable mirror, such collimating lens being focused on the central portion of the useful area in the inclined plane so as to form a collimated beam for reflection at the tiltable mirror, whereby the reflected beam provides, in the zero position of the tiltable mirror, an image of each of the two edges superimposed on the real other edge at the reflecting means, whilst the detecting means comprises photo-electric means responsive to light returned from the tiltable mirror to the inclined plane on one or other side of the area between the edges for measuring or indicating tilt of the mirror from its zero position. In the autocollimating system, the reflecting means preferably comprises an inclined reflector having a slit the direction of the length of which lies at least approximately parallel to the axis of tilt of the tiltable mirror, the photo-electric means being responsive to light reflected from such inclined reflector on one or other side of the slit. Two photocells are preferably employed to constitute the photo-electric means, so positioned as one to receive light returned to the inclined reflecting means on one side of the area between the edges and one to receive light returned to such plane on the other side of such area.

Figure 2:
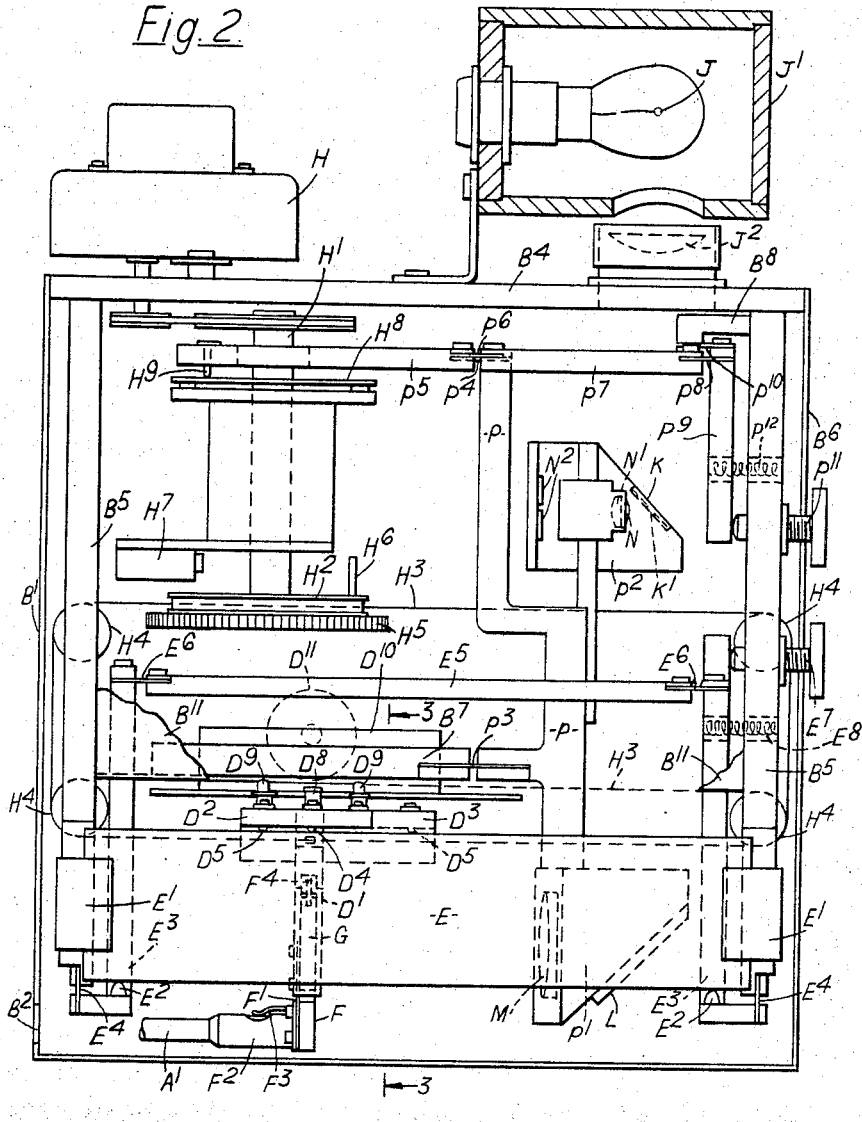
Figure 3:
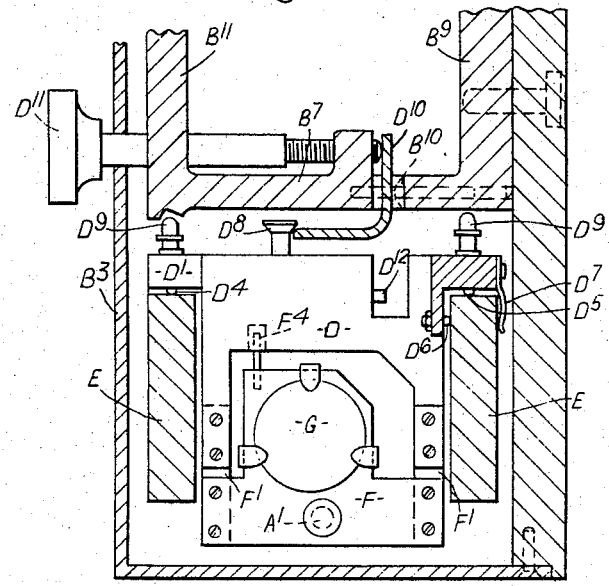
Figure 4:
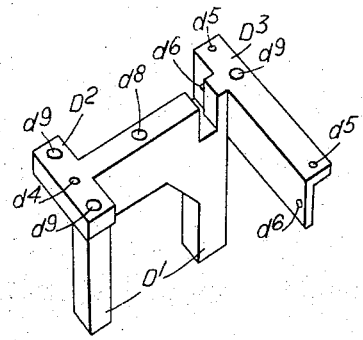
Figure 11:
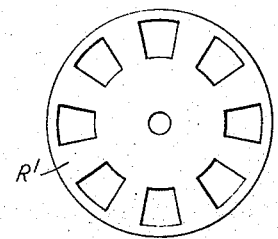
Figure 8:
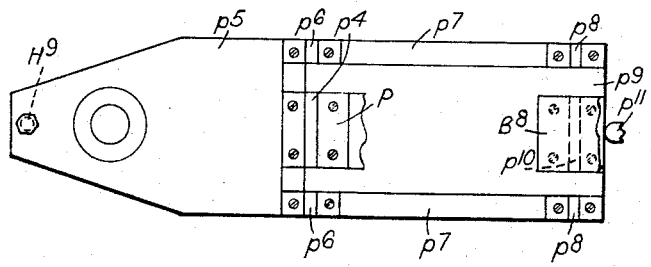
Figure 9:
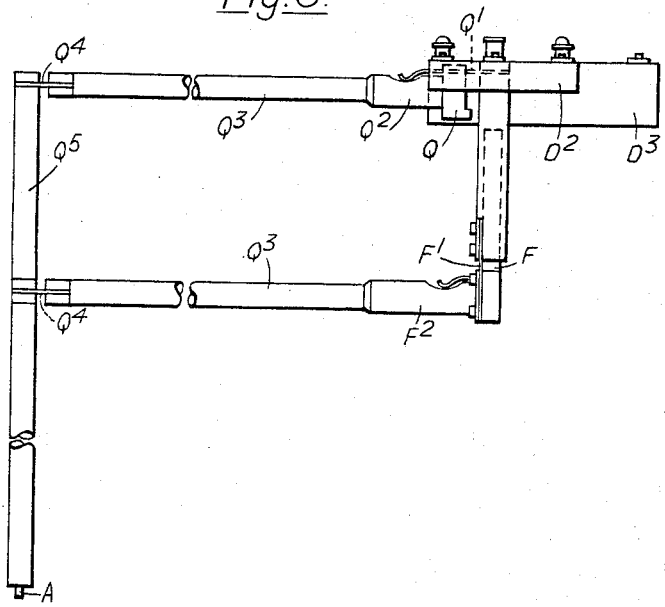
Figure 10:
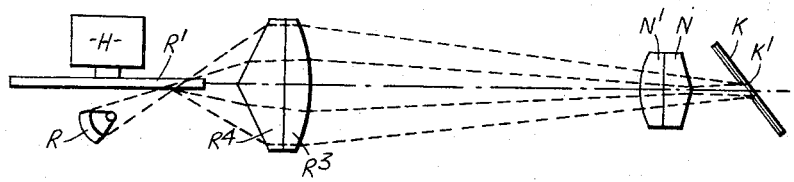
Figure 12:
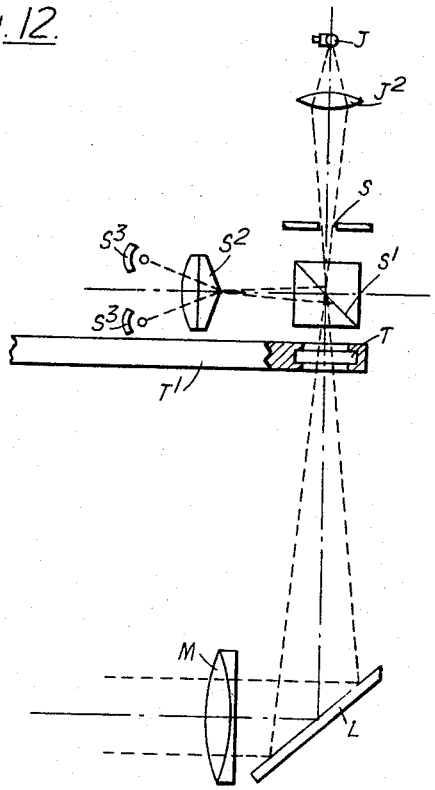
Figure 13:
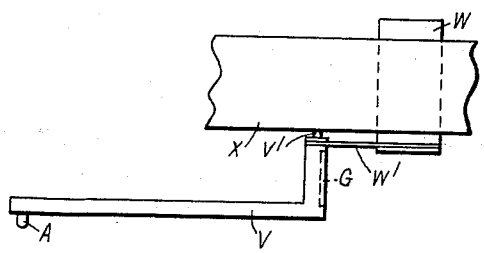

The invention may be carried into practice in various ways but a preferred practical arrangement of straightness testing apparatus according thereto together with some modifications will now be described by way of example with reference to the accompanying drawings, in which:

FIGURE 1 shows in front view a supporting structure for the preferred arrangement, the main parts of the apparatus being housed within a vertically movable casing, FIGURE 2 shows the preferred arrangement from the side, the near-side wall of the casing being removed, FIGURE 3 is a sectional view of the lower part of the arrangement on the line 3—3 of FIGURE 2, FIGURE 4 shows a detail of FIGURES 2 and 3, FIGURE 5 is a ray diagram of the optical system of the preferred arrangement, FIGURE 6 shows an output circuit for the photo-electric means of the optical system, FIGURES 7 and 8 show further details of FIGURE 2, FIGURE 9 shows a modified mounting for the feeler in the preferred arrangement, FIGURE 10 shows a modified form of detecting means for the optical system, and including an apertured disc shown in edge view, FIGURE 11 shows the apertured disc of FIGURE 10 in plan view, FIGURE 12 shows a modified optical system for use in the apparatus, and FIGURE 13 indicates diagrammatically a modification of the means for traversing the feeler.

As shown in FIGURES 1 and 2, in the preferred arrangement a feeler A having a rounded tip for engagement with the surface under test projects downwardly from the front end of a supporting arm $A^1$ which extends generally horizontally and forwardly through a hole $B^2$ in the front wall $B^1$ of a casing B near the lower edge of such wall.

The casing B is mounted in the manner shown in FIGURE 1 for movement on the vertical column C of a stand, the base of such stand constituting a worktable $C^1$ on which the workpiece carrying the test surface can be located. By means of a hand wheel $C^2$ the casing B can be raised or lowered to bring the feeler A into or out of engagement with the test surface, and a clamp $C^3$ is provided for locking the casing in the chosen position of vertical adjustment.

As shown in FIGURES 2 and 3, the feeler supporting arm $A^1$ is carried by a carriage D movable on feet along a pair of laterally spaced reference bars E extending from front to back of the casing B. The shape of this carriage D is shown in perspective in FIGURE 4. Such carriage D includes an inverted U-portion $D^1$ extending downwardly between the reference bars E generally in a plane transverse to the length of such bars, and on either side of the cross-piece of such inverted U-portion two elongated portions $D^2$ and $D^3$ carrying on their undersides the feet for running on the top faces of the reference bars E. One such portion $D^2$, of rectangular section, has a single foot $D^4$ for riding on one reference bar E, whilst the other portion $D^3$, of L-shaped section, has a pair of feet $D^5$ for riding on the other reference bar E. In addition, the latter portion $D^3$ has a pair of feet $D^6$ for engagement with the side of one reference bar E, a spring clip $D^7$ being provided to maintain proper engagement between such feet $D^6$ and such reference bar E, thereby minimizing lateral displacement of the carriage D during movement thereof along the reference bars E. The reference bars are made of glass, extremely accurately ground and polished so that their top faces provide an accurately straight reference surface along which the carriage D is movable. In FIGURE 4, the reference letters $d^4$, $d^5$ and $d^6$ are used to indicate the fitting points on the carriage D of the feet $D^4$, $D^5$ and $D^6$.

A fitting F is located between the arms of the inverted U-shaped portion $D^1$ of the carriage D, such fitting being pivotally connected to such arms by means of a pair of ligament hinges $F^1$. These ligament hinge connections $F^1$ permit pivotal movement of the fitting F relative to the carriage D about an axis lying parallel to the reference surface and at right angles to the direction of movement of the carriage along the reference surface. Adjacent to its lower edge this fitting F is formed with a forwardly projecting socket $F^2$ for receiving the rear end of the feeler supporting arm $A^1$, such arm $A^1$ engaging rigidly but detachably in such socket $F^2$. A spring $F^3$ acts to hold the feeler arm $A^1$ against the inside of the socket $F^2$. Above the socket $F^2$, i.e., between the arms of the inverted U-portion $D^1$ of the carriage D, the fitting F is formed as a mount for a rearwardly facing plane mirror G.

With this arrangement, as the carriage D is moved along the reference bars E, the feeler A is traversed along the test surface. Assuming that the reference surface lies parallel to the test surface, and that such reference surface is accurately straight, the feeler A will have a working movement during traversing, in a direction approximately normal to the test surface, in accordance with the lack of straightness of such test surface, the ligament hinges $F^1$ connecting the fitting F to the carriage D flexing to permit such working movement to take place. A stop $F^4$ is provided for preventing overlarge and possibly damaging pivotal movement of the fitting F relative to the carriage D.

Detection of the working movement of the feeler A is effected by means of an optical autocollimating system working in conjunction with the above-described mirror G carried by the fitting F and thereby tilting, in accordance with the working movement of the feeler, about the pivot of the fitting F defined by the ligament hinges $F^1$. The use of an autocollimator enables constant sensitivity to be obtained notwithstanding the movement of the mirror G along the reference surface during traversing.

Movement of the carriage D for traversing purposes is effected by means of a reversible electric motor H, mounted on top of the casing B at the front thereof coupled through a belt drive, or alternatively a suitable gear box, to a driving shaft $H^1$ extending downwardly within the casing. At its lower end, the driving shaft $H^1$ carries a drum $H^2$ for a driving cord $H^3$ which passes around two pairs of pulleys $H^4$, a pair of vertically spaced pulleys at the front of the casing B and a pair of vertically spaced pulleys at the back of the casing B. Between the two lower pulleys, the cord $H^3$ is secured to the carriage D as nearly as practicable at the center of action of the frictional forces acting on such carriage due to the sliding feet $D^4$, $D^5$ and $D^6$. The fixing element on the carriage D for connection to the driving cord $H^3$ is indicated at $D^2$ in FIGURE 3. Associated with the drum $H^2$ is a drum disc $H^5$ having a knurled edge projecting through a slot in the side wall $B^3$ of the casing B. This disc $H^5$ permits the carriage D to be moved by hand along the reference bars E, and if desired such disc $H^5$ may engage the driving shaft $H^1$ through a friction clutch (not shown) so as to be rendered inoperable when traversing is being effected by means of the motor.

An especially sensitive autocollimating system for use in detecting the working movement of the feeler A is claimed and described in the present applicant's copending United States patent application Serial No. 292,920, filed July 5, 1963.

Such autocollimating system includes a source of light J in a housing $J^1$ on the top of the casing B at the rear thereof, the light from such source J being focussed downwardly on a vertical optical axis through the top wall $B^4$ of the casing by means of a condenser lens $J^2$ on a slit $K^1$ in a plane reflector K lying in a plane inclined at 45 degrees to the optical axis, and the length of the slit $K^1$ being parallel to the axis of tilt of the mirror G on the carriage D. The beam of light from the slit $K^1$ passes to a 45-degree fully reflecting mirror L at the lower rear corner of the casing B, whereat the optical axis is turned through a right angle, the beam being reflected forwardly to a collimating lens M which produces the collimated beam for incidence on the tiltable mirror G. Assuming that the axis of the collimated beam lies accurately parallel to the reference surface, the tiltable mirror G has a zero position throughout traversing in which it lies in a plane normal to such optical axis. The collimating lens M is accurately focussed on the slit $K^1$ in the inclined reflector K so that, in the zero position of the tiltable mirror G, such collimating lens acts on the reflected beam to form a laterally inverted image of the slit exactly superimposed on the real slit. However, when during traversing the mirror G tilts from its zero position in accordance with the working movement of the feeler A, the beam reflected from such tilted mirror is laterally deflected relatively to the incident beam and the image of the slit $K^1$ is laterally displaced relatively to the real slit, so that light is incident on the inclined reflector K on one or other side of such slit therein.

FIGURE 5 is a ray diagram of the autocollimating system with optical axis $a$—$a$, and showing the pencil $b$ from the source J, the convergent pencil $c$ from the condenser lens $J^2$, two pencils $d$ and $e$ between the edges of the slit $K^1$ in the inclined reflector K and the collimating lens M, and the collimated beam $f$ between such collimating lens M and the tiltable mirror G, which is assumed to be in its zero position. Either pencil $d$ or $e$ may be taken as the divergent pencil from one edge of the slit $K^1$ to the collimating lens M, in which case the other pencil $e$ (or $d$) represents the corresponding return convergent pencil from the collimating lens to the other edge of the slit. It may be mentioned that in this figure the sizes and relative positions of the various parts of the system have been altered for maximum drawing clarity.

In a preferred construction, the inclined reflector K consists of a glass plate having a light-reflecting metallised coating covering the face thereof nearer to the collimating lens M except for an elongated rectangularly-shaped portion forming the slit $K^1$.

The limiting pupil of the system is preferably constituted by the tiltable mirror G, the collimating lens M having a clear diameter to receive all the light returned to it from such mirror, in all positions of such mirror.

Light incident on the inclined reflector K on one or other side of the slit $K^1$ therein is reflected forwardly to one or other side of the apex of a bi-prism N, on the front face of which is cemented a field lens $N^1$. Beyond such combined bi-prism N and field lens $N^1$ a pair of photocells $N^2$, each for receiving light reflected from one side of the slit $K^1$ only, are positioned. The bi-prism N and field lens $N^1$ act to form at each photocell an image of the collimating lens M or of the tiltable mirror G, so that a substantially constant area of the photocell $N^2$ covering the major portion of the sensitive area thereof is substantially uniformly illuminated, thereby ensuring that such photocell operates with maximum sensitivity and accuracy.

With the above-described arrangement, the output of each photocell $N^2$ is zero in the zero position of the tiltable mirror G with the exception of diffraction and aberration effects. Nevertheless, provided that the output of the photocells is taken differentially, a linear output characteristic is obtained through the zero position.

In the ray diagram (FIGURE 5), the divergent pencils to the photocells $N^2$ from the portions of the inclined reflector K immediately adjacent to the slit $K^1$ are indicated at $g^1$ and $g^2$. Since the tiltable mirror G is assumed in this drawing to be in its zero position, these pencils $g^1$ and $g^2$ should be considered as arising only due to diffraction and aberration effects.

A simple output circuit for the two photocells $N^2$ is shown in FIGURE 6. A differential voltage output is developed across resistors $N^3$ and taken to a D.C. amplifier $N^4$. The amplified signal is taken to a continuously recording instrument $N^5$ giving a direct measure of the changing angle of tilt of the mirror G as this varies during traversing, and thus a measure of the working movement of the feeler A.

In the above-described autocollimating system, the front surface (remote from the tiltable mirror) of the collimating lens M, and also the internal contact thereof, since it is preferred to employ a lens doublet for collimating purposes, tend to give rise to ghost images, as indicated at $x$ in FIGURE 5. These ghost images may give rise to errors in measurement when during traversing the tiltable mirror G passes through the range wherein such ghost images are formed. For avoiding possible errors thus arising, the two surfaces in question of the collimating lens M are coated for minimum reflection, and the central portion of the tiltable mirror G is masked, as indicated at $G^1$ in FIGURE 5, so as to be nonreflecting. In addition, the ends of the traversing range are determined by a limit switch, having a movable element $H^6$ on the drum $H^2$ for the driving cord $H^3$ and a fixed part $H^7$ adjacent thereto, which prevents the tiltable mirror G from too closely approaching the collimating lens M.

In the above-described apparatus, level-adjusting means are provided for adjusting the reference bars E relatively to the casing B to ensure that the reference surface lies parallel to the test surface. At their front and rear ends, the reference bars E are laterally positioned by U-shaped clips $E^1$ carried by framework members $B^5$ fixedly extending down within the casing B from the top wall $B^4$ thereof. Each reference bar E rests on a pair of upward supporting projections $E^2$, one near the front end and one near the rear end of such bar. The pair of supporting projections $E^2$ for the front ends of the bars E are formed on opposite sides of a flat L-shaped lever $E^3$, the free edge of the generally horizontal flat base of such lever being pivotally connected by means of ligament hinges $E^4$ to the adjacent framework member $B^5$. The flat generally vertical arm of the lever $E^3$ extends upwardly between the reference bars E. The pair of supporting projections $E^2$ for the rear ends of the bars E are formed on a generally similar lever $E^3$ pivotally connected through ligament hinges $E^4$ to the adjacent framework member $B^5$. Above the reference bars E, the upper ends of the two vertical arms of the levers $E^3$ are connected by a generally horizontal coupling arm $E^5$, the ends of such coupling arm $E^5$ being connected through ligament hinges $E^6$ to such upper ends of such arm. The reference bars E thus form part of a parallel-sided linkage, and adjustment to effect tilting of such two reference bars E simultaneously is effected by means of an adjustment screw $E^7$ passing through the rear wall $B^6$ of the casing and the adjacent framework member $B^5$ to engage the rear L-shaped lever $E^3$ at its upper end. A spring $E^8$ holds the lever $E^3$ in engagement with such adjustment screw $E^7$. When the adjustment screw $E^7$ is operated, tilting of the reference bars E is effected about a generally horizontal axis transverse to the direction of traversing, to bring the reference surface into parallel relationship with the test surface. For clarity, the lever element $E^3$ at the rear of the casing is shown in perspective in FIGURE 7, the point of connection of the ligament hinges $E^4$ and $E^6$ being indicated at $e^4$ and $e^6$.

It is to be noted that with this arrangement, the height of the carriage D relative to the test surface is not affected by such reference bar adjustment when such carriage is located at a particular intermediate position in the length of the reference bars E. For use in connection with another adjustment to be later described, this particular intermediate position is marked, for example by a mark on the feeler arm $A^1$ read against an index on the front wall $B^2$ of the casing B, or by a mark on the carriage D or on the driving cord drum $H^2$, these marks being read against an index seen through a window appropriately provided in the casing B.

The feeler A is initially brought into engagement with the test surface by lowering the casing B on the column C. However, the column adjustment by means of the hand wheel $C^2$ is rather coarse, and the vertical position in which the casing B is clamped to the column C may be such that the feeler supporting arm is tilted from the position associated with the zero position of the mirror G which tilts with such arm. Thus, due to such initial coarse height setting, the amplified output of the photocells $N^2$ may be outside the full scale reading of the recording instrument $N^5$. Effectively to provide for fine height adjustment, means are provided for adjusting the position of the above-described optical autocollimating system relatively to the casing B. Conveniently, for this purpose, the elements of the autocollimating system other than the source J and the condenser lens $J^2$ are mounted within the casing B on a frame P extending from near the top to near the bottom of the casing towards the rear end thereof. Thus, this frame P fixedly carries the collimating lens M and the adjacent inclined mirror L as a unit $P^1$ at its lower end and the inclined reflector K having the slit $K^1$, the combined biprism N and field lens $N^1$, and the photocells $N^2$ as a unit $P^2$ towards its upper end. Just above the lower unit $P^1$, the frame P is pivotally connected to a framework member $B^7$ fixed relatively to the casing B by means of a ligament hinge $P^3$, the axis of the pivot being generally horizontal and transverse to the direction of traversing. Thus, by a small movement of the frame P about its pivot $P^3$, the axis of the autocollimating system can be tilted to make the axis of the collimated beam more strictly at right angles to the plane of the tiltable mirror G which constitutes the equivalent of a fine height adjustment. In use, the fine height adjustment and the levelling adjustment of the reference bars E are sequentially effected. Thus, first of all, in setting up the apparatus, the carriage D is moved to the position at which reference bar adjustment has no effect on the height of the carriage relative to the test surface. Fine height adjustment is then made to obtain a substantially zero reading at the recording instrument. Under these conditions, the tiltable mirror G is reflecting the collimated beam straight back along the optical axis. The carriage D is then moved along the reference surface either by hand or by switching on the driving motor H, and the output at the recording instrument obtained. If, for example in the case of an electrical pen recorder, the pen traces a sloping record running off the top or bottom of the chart, then it is known that the reference surface is not parallel to the test surface, which is corrected by the level adjustment of the reference bars E, which has no reaction on the height setting effected at the particular intermediate position of the carriage.

Conveniently, the pivotal mounting of the autocollimating system is also used for another purpose, that of correcting for any small errors in the straightness of the reference bars E. For the purpose of such correction, the driving shaft $H^1$ for the driving cord drum $H^2$ carries near its upper end a disc cam $H^8$ by means of which minute variations of tilt of the frame P carrying the autocollimating system are effected during traversing, in order to compensate for the small errors of straightness in the reference bars E. The cam $H^8$ may be a flexible member adjustable by push and pull screws, or it may be rigid and made from the output record obtained when the feeler A is traversed across a master surface known to be absolutely straight.

The means by which tilting of the frame P is effected for the purposes of fine height adjustment and of correction for reference bar errors is most clearly shown in FIGURE 8. Thus, the upper end of such frame P is connected by means of a generally horizontal ligament $P^4$ to the rear end of a generally horizontal flat arm $P^5$ which at its front end carries a downwardly projecting button $H^9$ engaging with this disc cam $H^8$. The rear end of the flat arm $P^5$ is also connected through a pair of horizontal ligaments $P^6$ to a pair of coupling arms $P^7$ extending rearwardly on either side of the upper end of the frame P. The latter pair of ligament hinges $P^6$ lies in a horizontal plane very slightly above the level of the horizontal plane containing the ligament $P^4$. The rear ends of the coupling arms $P^7$ are connected through a pair of horizontal ligaments $P^8$ to the upper end of a generally vertical adjustment arm $P^9$, which between the ligaments $P^8$ is connected by means of a horizontal ligament $P^{10}$ to a bracket $B^8$ on the casing B. The ligament $P^{10}$ lies in a horizontal plane slightly above the level of the horizontal plane containing the ligaments $P^8$. The lower end of the adjustment arm $P^9$ is engaged by a fine height adjustment screw $P^{11}$ extending through the rear wall $B^6$ of the casing B and the adjustment framework member $B^5$ just inside such wall. A spring $P^{12}$ maintains the adjustment arm $P^9$ in engagement with the adjustment screw $P^{11}$.

With the above-described arrangement, operation of the adjustment screw $P^{11}$ causes a forward or backward movement of the coupling arms $P^7$ and thus of the upper end of the frame P, thereby tilting the autocollimating system accordingly. The difference in levels of the ligaments $P^8$ and $P^{10}$ at the upper end of the adjustment arm $P^9$ on which such screw acts affords a 20:1 reduction ratio. The movement of the cam operated arm $P^5$ during traversing imparts a similar forward or backward movement to the upper end of the frame P, but at a 3000:1 reduction ratio afforded by the very slight difference in levels of the ligaments $P^4$ and $P^6$. The track of the cam disc $H^6$ is made wide enough to accommodate the small movements of the arm $P^5$ which take place due to fine height adjustment.

For transport purposes, means are provided for lifting the carriage D off the reference bars E and for clamping such carriage D in a fixed position. In this connection (see FIGURE 3) the carriage D is provided on top of the cross-piece of the inverted U-portion $D^1$ with an upward boss $D^8$ having a radially projecting lip, and on top of the portions $D^2$ and $D^3$ with upward projections $D^9$. Mounted on a bracket $B^9$ fixed to the casing B is a clamping member $D^{10}$ of L-section elongated in the direction of traversing. The bracket $B^9$ affords a pivot $B^{10}$ whereby the clamping member $D^{10}$ can pivot about an axis parallel to the traversing direction, and a clamping screw D¹¹ passing through the side wall B³ of the casing B and an adjacent framework member B¹¹ extending down from the top wall B⁴ of the casing just inside such side wall engages the clamping member D¹⁰ to effect movement thereof about its pivot B¹⁰. By operation of such clamping screw D¹¹, the clamping member D¹⁰ can be moved about such pivot B¹⁰ to engage the underside of the lip of the boss D⁸ on the carriage D and lift such carriage into engagement, through the projections D⁹, with the fixed framework member B⁷ to which the frame P of the autocollimating system is pivoted. As shown in FIGURE 3, this framework member B⁷ may conveniently be integrally formed with the framework member B¹¹ extending down just inside the side wall B⁴ of the casing B. In FIGURE 2, the framework member is shown almost wholly cut away for clarity. The points of fixing on the carriage D of the boss D⁸ and the projections D⁹ are indicated at d⁸ and d⁹ respectively in FIGURE 4. The above-described clamping means is operable with the carriage at any position in the range of traverse.

The above-described arrangement may conveniently have a range of traverse of about 5 inches. When properly adjusted, magnification of errors of straightness up to 10,000 is obtainable. Errors of straightness as small as 5 microinches are readily detected.

Surfaces lying below the level of the surrounding material may be tested for straightness by mounting the feeler A in the manner shown in FIGURE 9. In this arrangement, an additional fitting Q is attached to the carriage D by means of a ligament hinge Q¹, such fitting including a forwardly projecting socket Q². The normal feeler supporting arm is detached from the standard socket F² on the fitting F, and into the two sockets Q² and F² are engaged a pair of forwardly extending arms Q³ which at their front ends carry on ligaments Q⁴ a generally vertical and downwardly extending feeler supporting arm Q⁵ carrying the feeler A at its lower end. Although not shown in other figures, the additional fitting Q will usually be provided on the carriage, the socket Q² not being used when the normal feeler supporting arm is engaged in the standard socket F² for testing purposes.

Various modifications of the above-described arrangement are possible within the scope of the invention. For example, FIGURE 10 shows a modification of the photoelectric detecting means employing only a single photocell R. In conjunction with this single photocell R an apertured disc R¹ is employed (see also FIGURE 11), such disc having one reflecting face. The disc R¹ is driven at a constant rotational speed during traversing from the driving motor H for the carriage D. The combined bi-prism N and field lens N¹ are retained just in front of the inclined reflector K having the slit K¹, but act to form an image of the collimating lens or the tiltable mirror on focussing means constituted by a collective lens R³ and bi-prism R⁴ in combination. In this way the beams from the inclined reflector are focused, by means of such combined lens R³ and bi-prisim R⁴, to form an image of the slit K¹ on the disc R¹, light from one side of the slit being incident on one face of such disc and light from the other side of such slit being incident on the other face of such disc. Light from one side of the slit K¹ is thus transmitted through the disc apertures to the photocell R, and light from the other side of the slit is reflected by the face of the disc to such potocell, which thus has an A.C. output at the frequency of rotation of the disc. In the region of zero tilt of the mirror G, the output of the photocell R includes a D.C. output, which arises due to diffraction and aberration effects and is therefore disregarded, being lost at the A.C. amplifier to which the photocell output is taken before being fed through a rectifier to the recording instrument.

Another modification of the autocollimating system is shown in FIGURE 12. In this modification, instead of an inclined reflector having a slit, a slit S and inclined semireflector S¹ spaced along the optical axis are employed. Thus the source J is focussed on the slit S by the condenser lens J², the beam from the slit passing through the semireflector S¹ to the inclined mirror L and the collimating lens M. The return beam is reflected at the semireflector S¹ to a beam splitter S², and the divided beams are incident on a pair of photocells S³. FIGURE 12 also serves to illustrate modified means for compensating for slight errors in the reference bars. Thus, instead of tilting the autocollimating system substantially as a whole in accordance with the movements of a cam operated lever, an optical deviating plate T is located in the path of the beam of light between the inclined semireflector S¹ and the inclined mirror L. This compensating plate T is mounted to tilt about an axis at right angles to the optical axis, and in its zero position in which it lies at right angles to the optical axis permits the incident beam and the reflected beam to pass through without deflection. The plate T is caused to tilt from its zero position by means of a pivoted arm T¹ engaging with the cam disc driven in synchronism with the traversing carriage.

A modification of the mounting of the carriage for traversing purposes is shown in FIGURE 13. In this arrangement, a feeler supporting arm V carrying the feeler A and the mirror G is towed behind a traversing carriage W on a ligament W¹, and such feeler supporting arm has a skid V¹ for riding on the reference surface X, being maintained in engagement therewith by slight biassing of the towing ligament W¹. The ligament W¹ also constitutes a hinge permitting the feeler supporting arm V to tilt in accordance with the working movement of the feeler A. The carriage W may be guided to move for traversing purposes along the member carrying the reference surface X, as indicated, but alternatively may be guided to move on an entirely separate member. Maximum accuracy of testing is obtained when the mirror G is mounted substantialy vertically beneath the skid V¹.

Various other modifications are possible within the scope of the invention.

What I claim as my invention and desire to secure by Letters Patent is:

1. Apparatus for measuring or indicating lack of straightness of a surface, comprising a reference element having an accurately straight reference surface lying substantially parallel to the surface under test, a feeler for engagement with the test surface, means for traversing the feeler along the test surface, a member moveable along the reference surface in synchronism with the traversing of the feeler, means permitting the feeler to undergo a working movement during traversing in a direction approximately normal to the test surface, a reflector device carried by the movable member and capable of tilting relatively to the reference surface in accordance with the working movement of the feeler, optical means for projecting a collimated beam of light substantially parallel to the reference surface so as to be incident on the reflector device throughout traversing, detecting means responsive to the deflection of the reflected beam of light for providing the desired measurement or indication, means for accurately locating such optical projection means and detecting means in predetermined relationship to the reference element at least during traversing, and adjustment means for setting a zero position of the reflector device in which it acts to reflect the collimated beam back along its axis to the deflection responsive means, whereby the optical projecting means constitutes an autocollimator.

2. Measuring or indicating apparatus as claimed in claim 1, in which the reflector device comprises a plane mirror mounted to tilt in accordance with the working movement of the feeler about an axis generally perpendicular to the optical axis from a zero position in which the plane of such mirror lies at right angles to the optical axis, and the optical projection means comprises reflecting means lying in a plane which is inclined to the optical axis and intersects a plane at right angles to the optical axis in a line parallel to the axis of tilt of the tiltable mirror, such reflecting means extending over a part only of the useful area in such inclined plane to define two edges between light-transmitting and light-reflecting areas which extend at least approximately parallel to the axis of tilt of the tiltable mirror, a source from which light passes to the reflecting means and thence to the tiltable mirror, and a collimating lens between the reflecting means and the tiltable mirror, such collimating lens being focussed on the central portion of the useful area in the inclined plane so as to form a collimated beam for reflection at the tiltable mirror, whereby the reflected beam provides, in the zero position of the tiltable mirror, an image of each of the two edges superimposed on the real other edge at the reflecting means, whilst the detecting means comprises photoelectric means responsive to light returned from the tiltable mirror to the inclined plane on one or other side of the area between the edges for measuring or indicating tilt of the mirror from its zero position.

3. Measuring or indicating apparatus as claimed in claim 2, in which the reflecting means comprises an inclined reflector having a slit the direction of the length of which lies at least approximately parallel to the axis of tilt of the tiltable mirror, the photo-electric means being responsive to light reflected from such inclined reflector on one or other side of the slit.

4. Measuring or indicating apparatus as claimed in claim 3, in which the deflection responsive means comprises two photo-electric cells, and means are provided for positioning such photo-electric cells so as one to receive light returned to the inclined reflecting means on one side of the area between the edges and one to receive light returned to such plane on the other side of such area.

5. Measuring or indicating apparatus as claimed in claim 1 in which means are provided for correcting any slight error arising due to lack of straightness of the reference surface, such correcting means including an operable cam shaped to suit the errors of the reference surface and driven in synchronism with the movement of the movable member along the reference surface.

6. Measuring or indicating apparatus as claimed in claim 5, in which the correcting means comprises an optical deviator provided in the path of the beam of light.

7. Measuring or indicating apparatus as claimed in claim 1, in which the feeler and reflector device are mounted on a feeler supporting arm pivotally mounted, about an axis transverse to the direction of traversing, on a carriage guided to move relatively to the reference surface for traversing purposes, such carriage having feet for riding on the reference surface, whereby such carriage constitutes the movable member.

8. Apparatus for measuring or indicating lack of straightness along a surface, comprising a reference element having a substantially straight reference surface lying substantially parallel to the test surface, an elongated feeler-supporting member extending lengthwise generally parallel to the reference surface, a feeler mounted adjacent to one end of such feeler-supporting member and for engagement with the test surface, means permitting longitudinal movement of such feeler-supporting member to cause the feeler to traverse along the test surface, including guide means cooperating with the reference surface and with the feeler-supporting member adjacent to the end thereof remote from the feeler, and detecting means for providing a continuous output representative of the tilting movement of the feeler-supporting member, such tilting movement of such member being dependent on the working movement of the feeler in a direction generally normal to the test surface, the detecting means comprising an autocollimator system having optical means for projecting a collimated beam of light on an optical axis substantially parallel to the reference surface, a mirror fixedly mounted on the feeler-supporting member adjacent to the guide means and for reflecting the beam of light in the reverse direction generally along the optical axis, and photo-electric means for receiving the reflected beam to provide an output representative of the tilting movement of the mirror and for operating a measuring or indicating instrument.

9. Apparatus as claimed in claim 8, in which the guide means also acts to hold the adjacent point of the feeler-supporting member against lateral movement during traversing.

10. Apparatus as claimed in claim 9, in which the guide means comprises a carriage having feet for riding on the reference surface, the feeler-supporting member being pivotally attached to such carriage.

11. Apparatus as claimed in claim 8, in which in order to provide for fine adjustment of the zero position of the apparatus, locating means for the optical detecting means is adjustable to permit such optical means to be located with its axis accurately parallel to the reference surface, adjustment means also being provided to locate the reference member accurately parallel to the test surface.

12. Apparatus as claimed in claim 11, in which means are provided for correcting small errors due to lack of straightness of the reference surface in the traversing direction, such correcting means comprising a cam shaped to suit the reference surface errors, means driving such cam in synchronism with the traversing of the feeler-supporting member, and means operatively connecting such cam with the adjustable locating means for the optical detecting means.

13. Apparatus as claimed in claim 8 in which the mirror constitutes, throughout the traversing range, the limiting aperture of the optical detecting means.

14. Apparatus as claimed in claim 8, in which the feeler-supporting member has a foot for constituting the guide means cooperating with the reference surface.

15. Apparatus as claimed in claim 8, in which the autocollimator system includes reflecting means lying in a plane which is inclined to the optical axis in a plane parallel to the axis of tilt of the tiltable mirror, such reflecting means extending over a part only of the useful area in such inclined plane to define two edges between light-transmitting and light-reflecting areas which extend at least approximately parallel to the axis of tilt of the tiltable mirror, a source from which light passes to the reflecting means and thence to the tiltable mirror, and a collimating lens between the reflecting means and the tiltable mirror, such collimating lens being focussed on the central portion of the useful area in the inclined plane so as to form a collimated beam for reflection at the tiltable mirror, whereby the reflected beam provides, in the zero position of the tiltable mirror, an image of each of the two edges superimposed on the real other edge at the reflecting means, while the detecting means comprises photo-electric means responsive to light returned from the tiltable mirror to the inclined plane on one or other side of the area between the edges for measuring or indicating tilt of the mirror from its zero position.

16. Apparatus as claimed in claim 8, in which the autocollimator includes a beam-splitting device for dividing the reflected beam of light into two portions, and the photo-electric means includes two photo-cells on which the two portions of the beam are respectively incident.

References Cited by the Examiner

UNITED STATES PATENTS 2,048,154    7/1936    Abbott et al. _____ 73—105
2,914,938   12/1959    Laakso _____ 33—172 X ISAAC LISANN, *Primary Examiner.*